United States Patent [19]

Maxey

[11] 4,107,744
[45] Aug. 15, 1978

[54] VARIABLE RATIO MAGNETIC TAPE DRIVE USING A VARIABLE BELT THICKNESS

[75] Inventor: Alexander R. Maxey, Santa Clara, Calif.

[73] Assignee: Arvin Industries, Inc., Columbus, Ind.

[21] Appl. No.: 729,672

[22] Filed: Oct. 5, 1976

[51] Int. Cl.² .................. G11B 15/28; G11B 15/46; G11B 19/28
[52] U.S. Cl. ............................. 360/73; 226/30; 226/178
[58] Field of Search ............ 360/73; 74/190.5, 217 R, 74/217 CV, 230.16, 230.18, 230.24, 231 R, 231 P, 231 PC, 722; 226/30, 31, 40, 178

[56] References Cited

U.S. PATENT DOCUMENTS

| 3,306,987 | 2/1967 | Guerth | 360/73 |
| 3,739,969 | 6/1973 | Warren | 226/178 |
| 3,873,765 | 3/1975 | Schoop et al. | 360/73 |

Primary Examiner—Alfred H. Eddleman
Attorney, Agent, or Firm—Biebel, French & Nauman

[57] ABSTRACT

A variable ratio drive employs an elastic extensible control belt which changes its cross-section in relation to induced changes in its length, according to Poisson's ratio. The control belt is introduced between a pulley and a drive belt, and a mechanism employing a gear head control motor, or the like, acts to change the length of the control belt in a precise manner. This in turn changes the thickness of the control belt in a precise way, and the effective radius of the pulley/control belt, acting on the drive belt, operates to change the ratio of the pulley and drive belt system. A specific embodiment is disclosed in a lightweight video tape recorder, used to change the drive ratio between a motor and a tape transport capstan, according to control signals.

9 Claims, 10 Drawing Figures

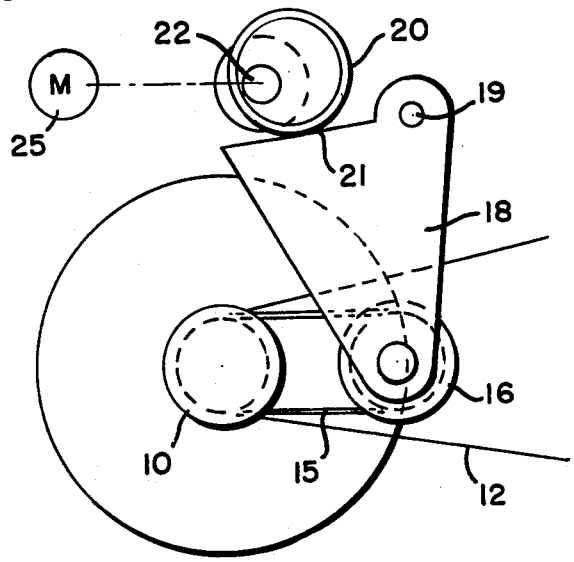
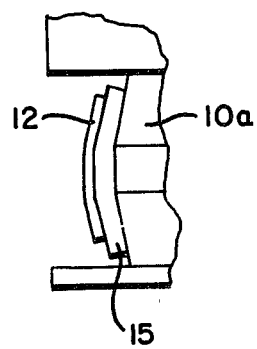
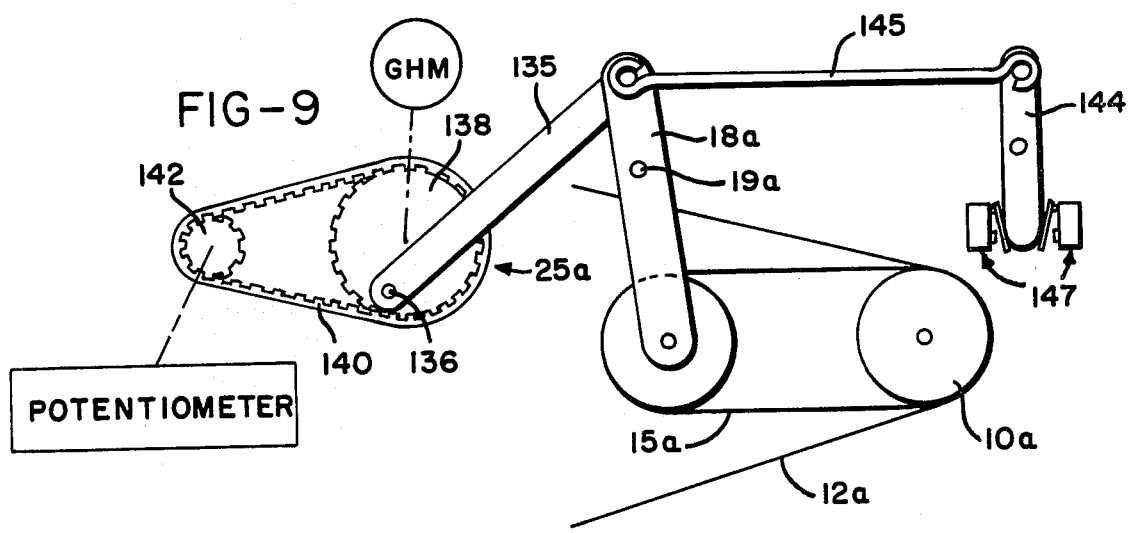
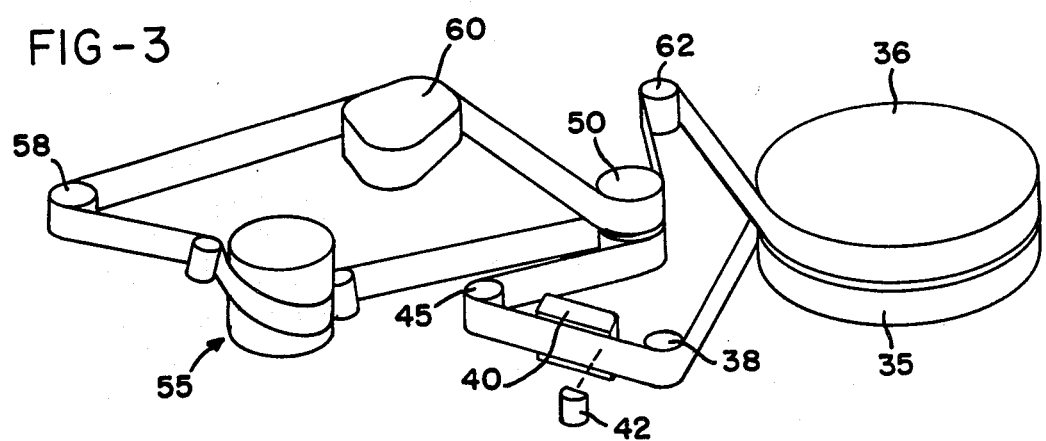

FIG-4
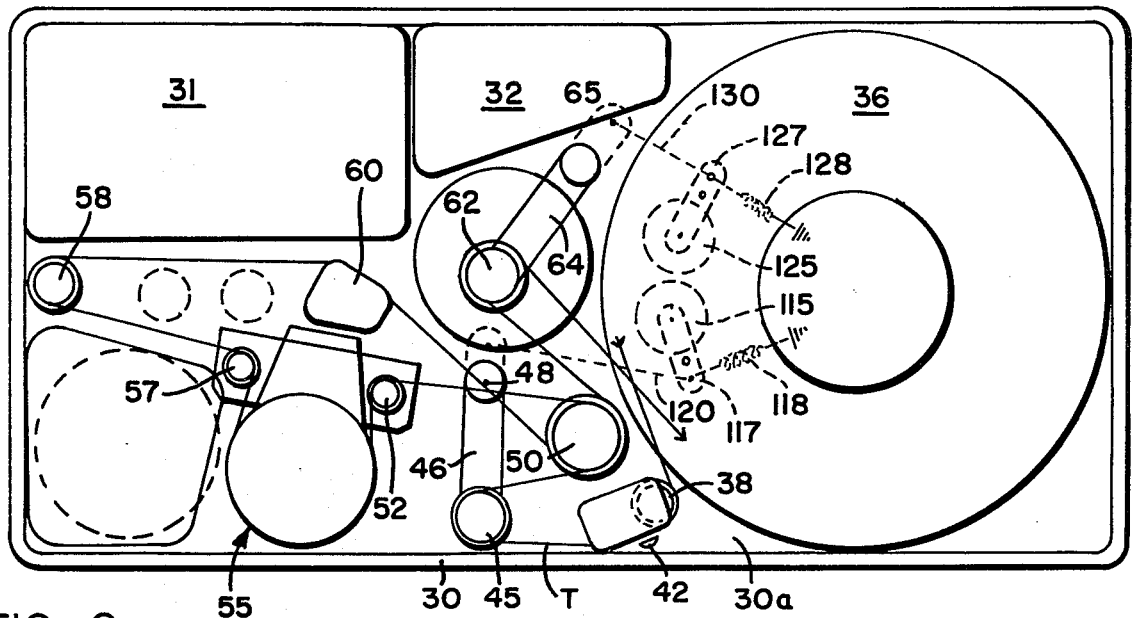
FIG-6
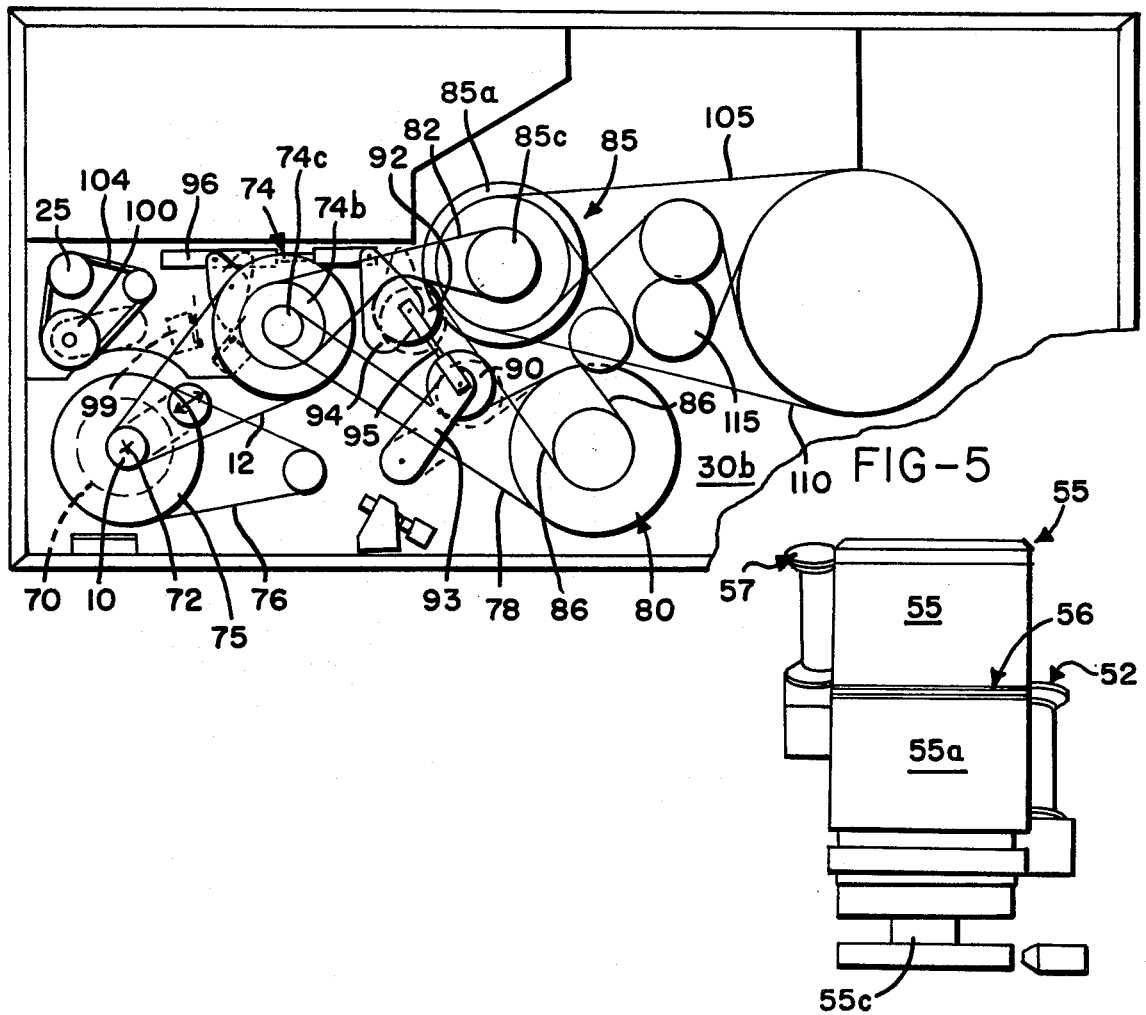
FIG-5

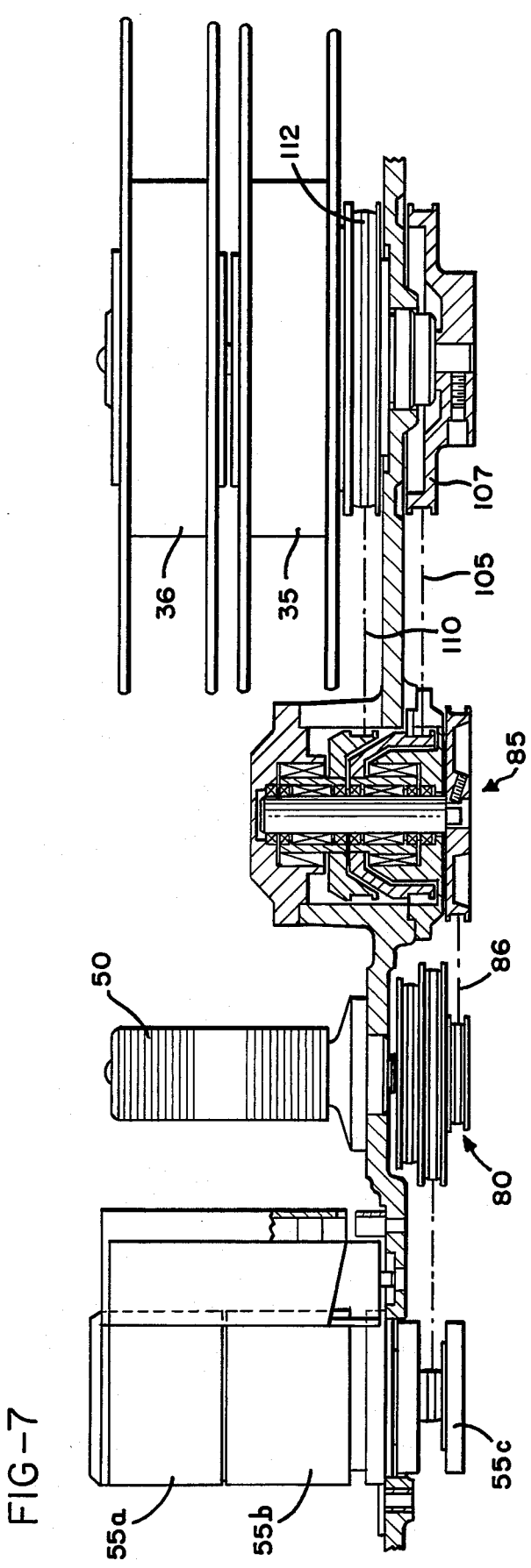

4,107,744

VARIABLE RATIO MAGNETIC TAPE DRIVE USING A VARIABLE BELT THICKNESS

BACKGROUND OF THE INVENTION

This invention relates to a variable ratio speed control useful in various forms of belt and pulley drives, particularly where precise speed changes over relatively small differences are required. One particular demand for such devices is in magnetic recording devices of the type which transport magnetic recording media past a scanning record/playback transducer which is moved, as by a rotating disc or drum, to scan repeatedly across the path of movement of the media.

A number of prior art devices have been proposed to satisfy this particular demand. One such device, employing controlled belt slippage, is described in U.S. Pat. No. 3,006,218. Another controlled slip or migrating belt device, offered in some commercial video tape recorders uses a motor which drives the tape transport capstan at a constant speed, and which overdrives the scanner through an elastic belt, using an eddy current brake to slow the scanner to the desired speed. A third approach has been to use separate motors to drive the transport (capstan) and the scanner, and to regulate their respective speeds to the desired ratio by electronic comparators and motor speed controls.

Where portable recorders present strict limitations as to size, weight, and/or power consumption these approaches are unsatisfactory. Belt slipping wastes power, extra motors add weight and require extra power for both drive and speed controls, and continually active slip controls (eddy current brakes) need continuous additional power in addition to wasting power with induced slipping.

Even where some or all of the aforementioned design limitations are not present, there exists a need for an accurate, predictable, minimum power consumption speed change device. This is especially for such devices which can easily be linked to servo systems, and which will consume only minimal power during speed changing mode, and not during steady running conditions at different speeds.

SUMMARY OF THE INVENTION

This invention provides an accurate simple, and precisely controlled variable speed ratio mechanism which is incorporated in a non-slip belt drive or the like. The effective radius of a drive input pulley, as seen by a driven belt which the pulley moves, is changed by varying the thickness of an elastic member introduced between the pulley and the driven belt. Preferably this member is a control belt which runs, under variable tension, between the pulley surface and the drive belt.

Controlled changes are introduced in the control belt tension, causing it to change in cross-sectional area, and thus in thickness, according to Poisson's ratio. By carefully adjusting the length of the control belt, its thickness around the pulley is changed, thus producing ratio changes in the belt and pulley coupling. This mechanism can be added to any convenenient part of a belt-pulley system, depending upon the total need to change the overall speed ratio of the system or to servo the ratio changes to slight amounts. Preferably the length of the control belt is controlled by changing position of an idler pulley or roller contacting that belt, and the idler position can be maintained as adjusted by a mechanism (e.g. a small gear head motor) which requires power only during periods of change.

The primary object of the invention, therefor, is to provide a simple speed ratio control in the form of a belt and pulley drive, wherein an elastic member is introduced between the belt and one pulley, the thickness of the elastic member is changed by changing its length, and the ratio of the belt to the pulley is thereby changed; to provide such a control which requires a minimum of space and/or power, yet is highly accurate; and to provide such a drive ratio control in the drive system of scanning type recorders.

Other objects and advantages of the invention will be apparent from the following description, the accompanying drawings and the appended claims.

BRIEF DESCRIPTION OF THE DRAWINGS

FIG. 1 is a plan view of the essential elements of a speed ratio control according to the invention;

FIG. 2 is an enlarged partial cross-section view of a pulley, drive belt, and control belt;

FIG. 3 is a perspective view of the major elements and tape path of a recorder using the control;

FIG. 4 is a plan view of a small video tape recorder using the control;

FIG. 5 is a view of the scanner part of the recorder;

FIG. 6 is a top view of the drive system of the recorder;

FIG. 7 is a side view of parts of the drive system;

FIG. 9 shows a modification of the speed ratio control.

DESCRIPTION OF THE PREFERRED EMBODIMENT

Figure 8A:
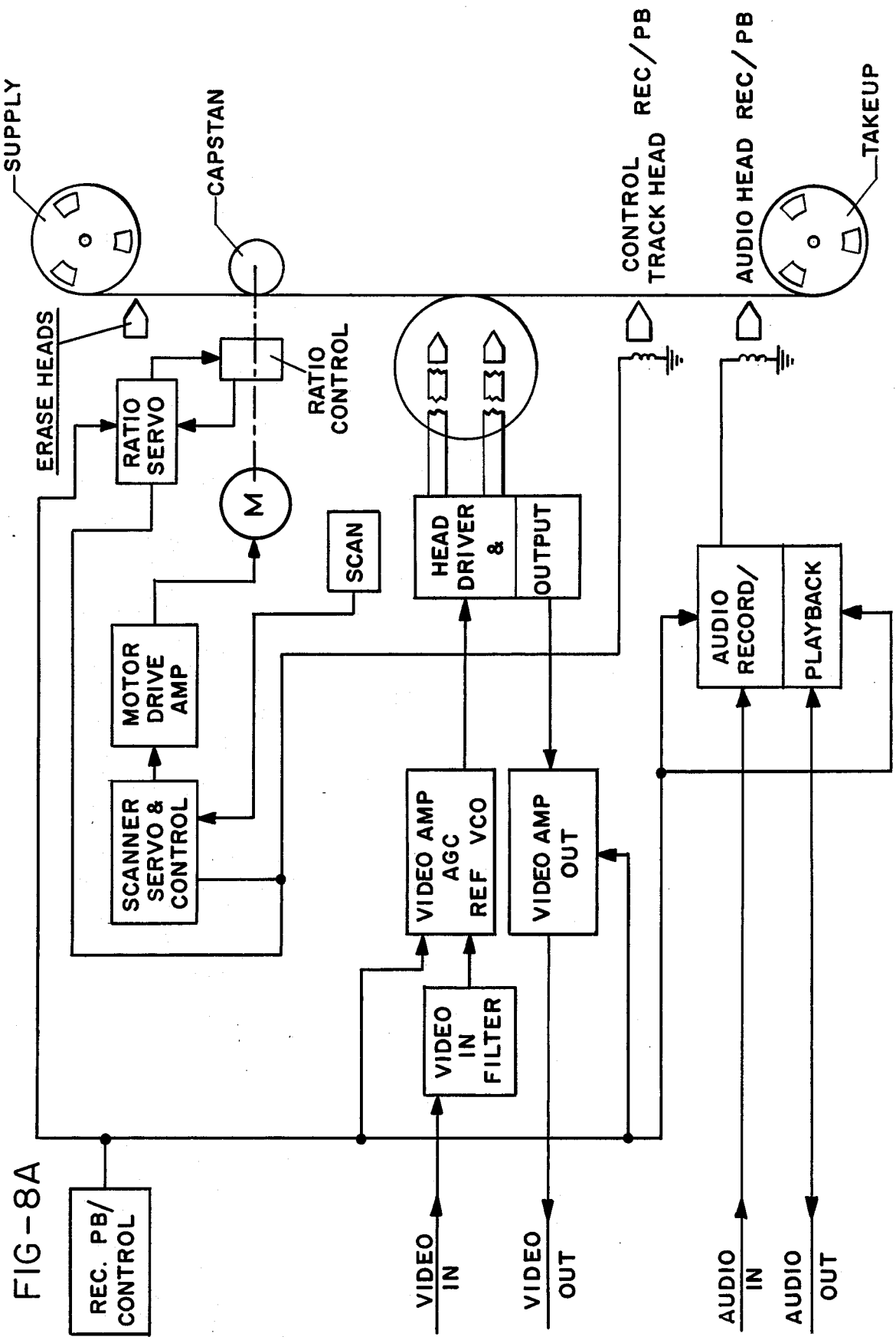
FIGS. 8A and 8B are system block diagrams for the recorder.

FIG. 1 shows the essential elements the variable ratio speed control which is provided by this invention; The input pulley 10 may be rotated by a suitable collar source, such as a motor later described. This pulley is intended to drive a larger driven pulley through a belt 12 which is passed around the pulley 10. Between the pulley surface 10a (FIG. 2) and the surface of the belt 12 there is a ratio control member 15 in the form of a further belt which is constructed of a suitable material such as polypropylene. The ratio control belt 15 also passes around a speed control idler pulley 16. The speed control idler pulley is mounted for free rotation on a control arm 18, and that arm is in turn pivotally mounted by a pin 19 to the deck or frame of the structure. A control cam 20 is engaged with a surface 21 of the arm 18, and this cam is rotatable about a shaft 22, being driven by a suitable small motor 25, preferably a gear head motor which employs a substantial gear reduction in its output, thereby enabling the shaft 22 to maintain whatever position it is moved into by the control motor 25.

The control belt 15 thus can be stretched by moving the idler control pulley 16 toward or away from the power input pulley 10. As the length of control belt 15 is changed, either shortened or lengthened, this effects a corresponding change in the cross-section of that belt, this change occurring in accordance with Poisson's ratio. The effective radius of the input pulley 10, as seen by the Mylar belt and acting on the power transmission belt 12, changes corresponding to the change in thickness of the control belt 15. In a typical example, using a polyurethane belt 0.031 inch in thickness for the control belt 15, and using a Mylar belt of about 0.005 inch thickness for the belt 12. A typical change in length of the belt 12 in the order of ten percent will cause a change in the cross-sectional area of that belt, in keeping with Poisson's ratio, of approximately the square root of this value in thickness. Since both the width and the thickness of the belt 15 change with induced change of its length, it is preferred that the nominal or beginning width of the belt 15 be somewhat greater than the width of the belt 12, as shown in FIG. 2. Also, it is desirable that the surface 10a of the drive pulley 10 be somewhat crowned, as shown in FIG. 2, in order to assure that the belts self-center on the pulley.

FIG. 3 is a perspective view of the tape path of a novel portable video tape recorder which is particularly suited to application of the variable ratio drive just described. FIG. 4 is a top plan view of the same path, showing the case 30 of the recorder, containing housings 31 and 32 which hold the electronic packages associated with the recorder. The case includes a base plate 33 supporting a supply reel 35, at a lower level on the housing 30, and a take-up reel 36 which is located above and coaxial with the supply reel. Each of these reels is mounted for rotation on coaxial shafts (not shown), and may be provided with suitable restraining mechanism, as known in the art, in order to prevent the tape from running loose from either of them. The tape T passing from the supply reel 35 is threaded around an idler pulley 38 and past a sensing station 40 which incorporates a full track erase head and selected other controls, including an end of tape sensor 42.

Beyond the station 40 the tape passes around a supply servo roller 45 which is mounted on a compliance arm 46, that are in turn being pivotally supported to the baseplate at 48. The tape passes from the roller 45 around the lower portion of a capstan 50, and from that capstan to the input spindle 52 of a scanner assembly 55. This assembly may be of the type disclosed in U.S. Pat. No. 3,516,146. The spindle 52 guides the tape onto the surface of the upper 55b and lower 55a drums of the scanner assembly (see FIG. 5) and in the center of the scanner assembly are the rotating heads 56 which traverse a path at an angle to the edges of the tape, as is well known in the art. Passing from the upper drum 55b, the tape leaves the scanner assembly via the output spindle 57 and passes to a reversing roller or idler 58. Then, the tape path extends back, behind the scanner assembly, over the audio record/reproduce and control track heads contained in the housing 60, and back to the upper portion of the capstan 50. The tape exits from the capstan to and around the take up tension control idler 62, which is mounted on compliance arm 64. That arm in turn is pivoted to the baseplate at 65. From the roller 62 the tape returns to the tape pack, specifically to the take up reel 36 as shown in FIG. 3.

The entire transport is driven by a single electrical motor which is shown in FIG. 6 as mounted below the surface of the base plate 33. It should be understood that FIG. 6 shows the various drive mechanisms which are incorporated in the lower level of housing 30 beneath the base plate 33, as if viewed through that plate. Details of the control shown in FIG. 1 have been omitted. The shaft of the motor 70 is indicated at 72, being coupled to the input pulley 10. The drive belt 12 is threaded at its other end around the larger of a triple cluster pulley indicated by the general reference numeral 74. In addition to driving the pulley 10, the motor shaft 72 also drives a larger pulley 75 which is connected through belt 76 to the driven pulley 55c (FIG. 5) of the scanner assembly. Thus, the rotational speed of the heads within the scanner assembly is in direct ratio to the rotation of the drive motor 70.

The smallest pulley 74c of the cluster 74 is connected through a drive belt 78 to the larger one of a double pulley 80 which is in turn fastened to the shaft of capstan 50. The intermediate pulley 74b of the cluster 74 is connected via a drive belt 82 to the smallest pulley 85c of a clutch cluster 85, and the largest pulley 85a of that cluster is connected through belt 86 to the smaller of the double pulley 80 on the capstan shaft. A pair of adjustable idlers 90 and 92 are provided, the former in position to engage belt 78, and the latter in position to engage belt 82.

Idler 90 is supported on a pivotally mounted shaft 93, and idler 92 is mounted on a pivotally supported plate 94, and the plate and arm connected by a link 95, causing them to move jointly. Control motion is transmitted to arm 93 through the link and plate 94, and the input of this motion is derived from a further link 96 which is appropriately moved back and forth, by the output of a reversible gear head motor 98. In the normal forward movement of the tape, as for recording or playback modes, the mechanism is moved such that idler 90 takes up slack in tape 78 and the capstan is driven through that tape and the larger of the pulley 80. At this time the idler 92 is moved away from tape, it is slack and slips on the pulleys 74b and 85c. For fast forward and rewind mode this condition is reversed and the drive to the capstan is through the belt 82 and the belt 86 to the smaller of the double pulley 80 attached to the capstan shaft. Suitable limit switches 99 may be positioned to limit the extent of the output of motor 25, and a position indicating potentiometer 100 is also driven from this motor. Cams 102 operating switches 99, and the potentiometer 100, are linded to motor 25 by a toothed belt 104.

The drive to the reels is provided by belts driven from the cluster 85. Belt 105 (FIGS. 6 and 7) drives a pulley 107 which is attached to the shaft of take-up reel 36, and belt 110 drives a pulley 112 which is attached to the shaft of supply reel 35. These shafts are coaxial.

A tension control idler 115 is carried on a pivotable arm 117, and is urged by spring 118 (FIG. 4) to apply tension to belt 110 and thus tend to rotate the take-up reel. This motion is resisted by force from tension in tape T tending to move idler roller 45. This force is coupled from compliance arm 46 through a link 120 to the arm 117.

Similarly, a tension control idler 125 is carried on a pivotable arm 127, urged by a spring 128 to tension belt 105. This action is countered by force from tape tension acting on idler 62. Its compliance arm 64 is connected by a link 130 to the arm 127.

Thus in record, playback and fast forward modes the take-up reel 36 is driven via belt 105, and the tension in belts 105 and 110 is adjusted as necessary. Conversely, in the rewind mode the supply reel 35 is driven via belt 110, and tension in belts 110 and 105 is adjusted as necessary. These adjustments occur automatically through the mechanical elements just described, with tape transport power all derived from one drive motor. Also, further details are disclosed in U.S. Pat. No. 3,390,841.

FIG. 9 shows a somewhat modified form of the ratio control. Similar parts to those in FIG. 1 are shown with the same reference and the suffix a. Arm 18a is pivotally mounted at 19a, and is connected by a link arm 135 to an offset pin 136 on the output wheel 138 of the gear head motor 25a. A toothed belt 140 drives a position indicating (feedback) potentiometer 142. A pivoting switch control arm 144 is connected to arm 18a by a link 145, and is arranged to actuate appropriate limit switches 147.

Figure 8B:
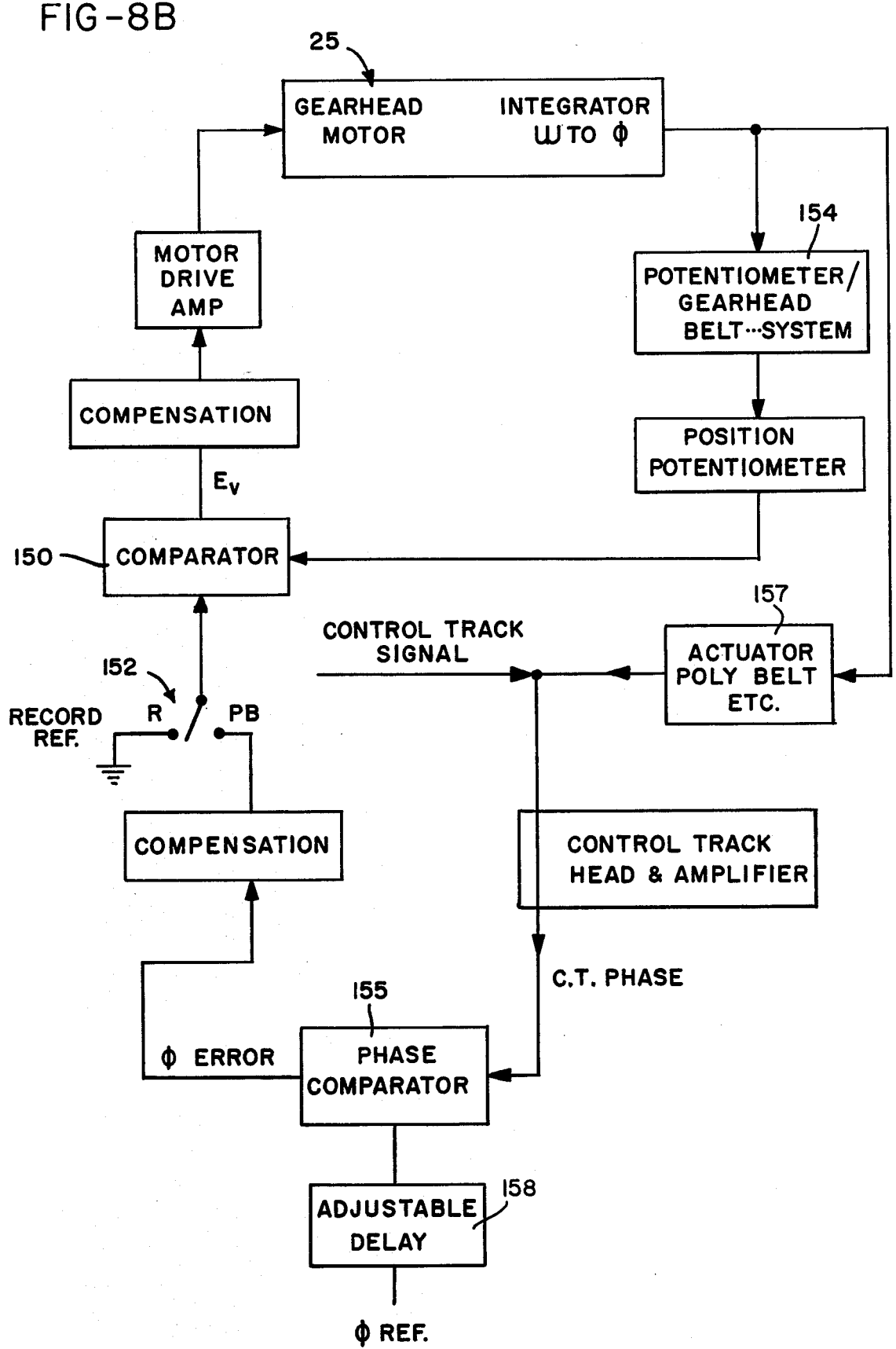

FIG. 8A is a block diagram of the general recorder system, and FIG. 8B is a diagram of the speed ratio control servo. The legends on the diagram 8A are self explanatory, and represent sub-systems and components which are per se well known in video tape recorders of the scanning type. Reference numerals have been applied where applicable to like components previously described.

FIG. 8B represents the ratio control and servo from a servo systems viewpoint. In the record mode phase comparator 150 is connected to a reference voltage (for example ground) through a switch 152 of the record/playback function control. The comparator output voltage signal Ev is compensated and the resulting signal is amplified to drive the ratio control gear head motor 25. The block 154 represents the mechanical portion of the control comprising the gearhead motor, position potentiometer 100, and the toothed belt. The potentiometer feedback is coupled back to comparator 150. Thus the gearhead motor is driven to a position corresponding to zero comparator output, and remains there in the record mode.

During playback mode switch 152 is transferred to receive compensated output from a phase comparator 155. This output represents phase error between the desired and actual phase between the moving tape and the scanner. Block 157 represents the mechanical part of the controller including belts 12 and 15, and the actuator parts 16, 18, 20. To this is added a signal derived from the control track head (FIG. 8A). This signal is read from a control track signal recorded from a suitable reference source during record mode.

This same reference source provides one input to comparator 155, through an adjustable delay 158. Adjustment of this delay provides a tracking control. The other input to comparator 155 is from the signal read from the control track, and the resulting phase error signal at the output of comparator 155 provides the external control signal to the gearhead motor servo loop, driving that motor until the phase error is eliminated. At this time the gear head motor draws no power, but holds its position due to the substantial gear reduction in its output.

While the forms of apparatus herein described constitute preferred embodiments of the invention, it is to be understood that the invention is not limited to these precise forms of apparatus, and that changes may be made therein without departing from the scope of the invention.

What is claimed is:

1. In a recorder having
means defining a path for the recording media,
drive means for advancing the media along said path including a drive motor,
pulleys and a drive belt providing a power transmitting connection from said motor to said drive means;
the improvement comprising
a drive ratio control belt running over one of said pulleys underneath said drive belt,
said control belt being variable in thickness to change the effective radius of said drive belt around said one pulley, and
tensioning means acting on said control belt to stretch it and thereby to vary its thickness between said one pulley and said drive belt to control the driving speed ratio between said motor and drive means.

2. A recorder as defined in claim 1, wherein velocity control signals are derived from said media,
feedback means for producing such control signals, and
a feedback connection from said feedback means to said tensioning means to vary the drive speed under the influence of such control signals.

3. A recorder as defined in claim 1, wherein said tensioning means includes an idler contacting said control belt in spaced relation to said one pulley, and an actuator connected to move said idler to a plurality of locations at different spacings from said one pulley.

4. A recorder as defined in claim 3, wherein said actuator is a motor member capable of remaining in any adjusted position without continued application of power thereto.

5. A recorder as defined in claim 4, wherein said motor is an electric gear head motor having a substantial gear reduction in its output.

6. In a magnetic tape recorder having
a tape supply and a take-up
means defining a tape path from the supply to the take-up,
a scanner assembly mounted along the tape path and incorporating at least one head and means for repeatedly scanning said head across the tape,
a capstan for moving the tape along the path,
a control head for record/playback of a control track,
a drive motor
first drive connections from said motor to said scanner assembly,
second drive connections from said motor to said capstan,
said first drive connections including pulleys and a drive belt,
a flexible extensible speed control member running over one of said pulleys and between said one pulley and said drive belt, and
means to change the extension force on said speed control member so as to vary the effective radius through which said one pulley acts on said drive belt.

7. A recorder as defined in claim 6, including a servo system controlling said means for changing the force on said belt member, said servo system having one input from a signal source corresponding to the actual speed of the tape along the path.

8. A recorder as defined in claim 7, wherein said servo system also is provided with a reference input related to the speed at which said drive motor is rotated.

9. A recorder as defined in claim 7, including a position detecting device coupled to said means for changing the force on said belt member, and
a feedback connection from said position detecting device to said servo system.

* * * * *